(12) United States Patent
Ahmed

(10) Patent No.: US 8,662,068 B2
(45) Date of Patent: Mar. 4, 2014

(54) OUTDOOR COOKER AND LID THEREFOR

(75) Inventor: Mallik Ahmed, Columbus, GA (US)

(73) Assignee: W.C. Bradley Co., Columbus, GA (US)

( * ) Notice: Subject to any disclaimer, the term of this patent is extended or adjusted under 35 U.S.C. 154(b) by 71 days.

(21) Appl. No.: 13/348,974

(22) Filed: Jan. 12, 2012

(65) Prior Publication Data

US 2013/0008427 A1    Jan. 10, 2013

Related U.S. Application Data

(60) Provisional application No. 61/432,464, filed on Jan. 13, 2011.

(51) Int. Cl.
*F24B 3/00* (2006.01)

(52) U.S. Cl.
USPC .......................... 126/25 R; 126/28; 126/220

(58) Field of Classification Search
USPC .............. 126/25 R, 15 A, 15 R, 77, 112, 146, 126/163 A, 163 R, 193, 211, 28, 220; 220/374
See application file for complete search history.

(56) References Cited

U.S. PATENT DOCUMENTS

| | | | | |
|---|---|---|---|---|
| 3,623,458 | A | * | 11/1971 | Block .......................... 122/18.4 |
| 3,633,561 | A | * | 1/1972 | Barnett et al. .............. 126/21 R |
| 4,127,216 | A | * | 11/1978 | Martin et al. ................. 220/374 |
| 4,267,817 | A | | 5/1981 | Hicks et al. |
| 4,392,477 | A | | 7/1983 | Milligan |
| 4,757,425 | A | | 7/1988 | Waltz |
| 4,832,000 | A | | 5/1989 | Lamppa et al. |
| 4,893,609 | A | | 1/1990 | Giordani et al. |
| 5,934,183 | A | | 8/1999 | Schlosser et al. |
| 6,012,381 | A | * | 1/2000 | Hawn ............................... 99/340 |
| 7,060,942 | B2 | * | 6/2006 | Friedl et al. .................. 219/411 |
| 8,074,634 | B2 | * | 12/2011 | Best ............................ 126/25 R |
| 2010/0252021 | A1 | * | 10/2010 | Bryce et al. ................. 126/25 R |
| 2011/0219958 | A1 | * | 9/2011 | Noble .............................. 99/473 |

OTHER PUBLICATIONS

International Search Report and Written Opinion of PCTUS2012021046, Mailed May 1, 2012.

* cited by examiner

*Primary Examiner* — Kenneth Rinehart
*Assistant Examiner* — Bao D Nguyen
(74) *Attorney, Agent, or Firm* — Fellers, Snider, Blankenship, Bailey & Tippens, P.C.; David G. Woodral

(57) ABSTRACT

An outdoor cooking apparatus with a lid having a flue gas flow channel therein which extends over at least most of the upper opening of the cooker firebox. The flue gas flow channel is formed between an inner lid wall and a second lid wall outside of the inner wall. One or more inlet openings are provided in the inner wall for receiving the cooker flue gas and one or more discharge openings are provided in the second wall for discharging the flue gas.

12 Claims, 9 Drawing Sheets

OUTDOOR COOKER AND LID THEREFOR

RELATED CASE

This application claims the benefit of U.S. Provisional Patent Application Ser. No. 61/432,464, filed Jan. 13, 2011 and incorporates said provisional application by reference into this document as if fully set out at this point.

FIELD OF THE INVENTION

The present invention relates to lids for grills and other outdoor cooking apparatuses and to cooking apparatuses which use such lids.

BACKGROUND OF THE INVENTION

A conventional prior art grill 2 of a type well known in the industry is illustrated in FIG. 1. The prior art grill 2 comprises: a grill housing 4 having an open-topped firebox 5; at least one burner or other heat source 6 which is or will be positioned in a lower portion of the firebox 5; a food support grate 8 positioned within or near an upper portion of the firebox 5 such that the food support grate 8 is above the heat source 6; and a lid 10 having side walls 11 which are rotatably connected to housing side walls 13 extending upwardly from the firebox 5 such that the lid 10 can be pivoted between an open position and a closed position for opening and closing the grill 2.

The heat source 6 used in the grill 2 can be one or more gas burners, one or more electric heating elements, a charcoal bed, a wood pellet burner, or any other type of heat source used in grills or other outdoor cookers. The food support grate 8 can be an open wire convection grate, an infrared cooking grate, a combination convection and infrared grate, or any other type of cooking grate used in grill assemblies or other outdoor cooking apparatuses.

The prior art grill lid 10 illustrated in FIG. 1 has a hood-type configuration which includes a spacious, upwardly-extending interior 12 which (a) provides room for larger food products and (b) can also provide space for one or more warming racks, a rotisserie, and/or other such appliances or features.

The prior art lid 10 further comprises: a horizontally-extending front bottom edge 14 which rests on an upper horizontal front surface 20 of the firebox housing 4 when the lid 10 is closed; a horizontally-extending rear bottom edge 16 positioned on the back side of the grill 2; and an overarching top 18. The overarching top 18 extends (a) upwardly from the horizontally extending rear bottom edge 16 of the lid 10 at the back of the grill 2, then (b) forwardly (and typically also downwardly to some degree as shown in FIG. 1) above the firebox 5 from back to front, and then (c) downwardly to the horizontally extending front bottom edge 14 of the lid 10. The overarching top 18 can be a single-walled structure or can alternatively be a double-walled structure as shown in FIG. 1 in order to reduce the temperature of the outer surface of the lid 10 during operation for greater safety and to protect the lid form discoloration or other damage.

The prior art grill lid 10 is designed such that, when the lid 10 is closed as illustrated in FIG. 1, a horizontal gap 24 is formed across the back side of the grill 2 between the horizontally-extending rear bottom edge 16 of the lid 10 and the horizontally-extending upper edge or end 26 of a short upwardly-extending back wall 28 of the grill housing 4. The horizontal gap 24 between the lid 10 and the back wall 28 of the housing is provided across the back of the prior art grill 10 for venting flue gas from the interior of the grill 2, as illustrated by arrows 30, when the lid 10 is closed.

Conventional prior art grill lids 10 of the type illustrated in FIG. 1 have various significant shortcomings and deficiencies which adversely affect the operation, cooking performance, and thermal efficiency of the prior art cooker 2. During operation, the flue gas 30 produced in the cooker 2 follows the path of least resistance and rushes through the venting gap 24 provided between the back edge 16 of the lid 10 and the back wall 28 of the housing 4. As a result, the volume of flue gas 30 which flows through the front portion 32 of the cooking grate 8 can be much less than the volume which flows through the back portion 34 of grate 8. This results in an uneven heat distribution at the cooking surface which significantly downgrades the cooking performance and the cooking consistency of the prior art grill 2. In addition, the loss of so much unused, high temperature heat energy as a result of the rapid escape of the hot flue gas along path 30 through the gap 24 in the back of the prior art grill 2 greatly reduces the thermal efficiency of the cooking apparatus.

Further, the rush of flue gas along the path of least resistance through the back opening 24 of the prior art grill 2 also creates an undesirable low pressure zone in the front portion of the firebox 5. The creation of this low pressure region further reduces the efficiency of the grill apparatus 2 by (a) pulling an excessive amount of secondary combustion air into the housing firebox 5 and (b) causing the infiltration of additional air through openings which happen to be present in the front of the firebox 5 such as, for example, any gap which is present between the front-side bottom edge 14 of the lid 10 and the upper front surface 20 of the firebox 5. This infiltrating air, particularly if it enters beneath the front edge 14 of the lid 10 at or near the level of the cooking grate, cools the front of the firebox 5, particularly the front portion 32 of the cooking area.

The addition of infiltrating air and/or excessive secondary air also increases the fuel demand of the system in order to heat the additional air to cooking temperature. This, in turn, not only reduces the efficiency of the system, but, by consuming heating capacity, also reduces the maximum cooking temperature achievable in the grill 2.

Also, in the prior art grill 2, the contribution of the prior art lid 10 to the cooking process is very limited. The interior surface 40 of the overarching top 18 of the prior art lid 10 will reflect or emit some radiant energy received from the heat source 6 and/or the cooking grate 8. However, very little heat energy from the hot flue gas is absorbed by the top interior wall 40 of the prior art lid 10 for radiant emission back to the food product. One reason for this is that the flue gas in the upper interior region of the lid 10 is substantially stagnant. Consequently, the high temperature flue gas flows out of the back opening 24 without providing beneficial heat transfer to the top interior wall 40 of the lid 10.

Another problem commonly experienced with the prior art grill lid 10 is that, in windy conditions in excess of 10 miles per hour, wind flow can effectively block the flue gas exhaust opening 24 and/or result in the inflow of outside air through the rear exhaust gap 24 as illustrated in FIG. 2. This disrupts and/or cools the cooking process. Moreover, at increased wind or wind gust velocities, the resulting blockage and/or inflow can create sufficient back pressure within the grill 2 to choke or blow out a grill burner 6, thus stopping the cooking process altogether. When this happens, a dangerous accumulation of uncombusted gas can also occur within the grill 2.

SUMMARY OF THE INVENTION

The present invention provides an inventive outdoor cooker and lid therefor which satisfy the needs and alleviate the problems and shortcomings of the prior art cooker discussed above. In one aspect, the inventive lid preferably comprises a flue gas flow channel which will extend over at least most of the cooker firebox and/or at least most of the food support grate when the lid is closed. The flue gas flow channel is formed between a channel inner wall which is closest to the firebox and/or cooking grate, and a channel outer wall which is positioned outside of the inner channel wall and is spaced apart therefrom. The lid further comprises a flue gas inlet opening provided through the inner channel wall for receiving a cooker flue gas and a flue gas outlet opening provided through the outer channel wall of the lid for discharging the flue gas from the flue gas flow channel.

As used herein, the term "flue gas" refers to the products of combustion, heated air or excess air, and/or any other gaseous or vapor products produced by a burner, charcoal bed, electric heating element, wood pellet burner, or any other heat source used in an outdoor cooker.

The inventive lid has a forward portion, which will be located at the front of the cooker and will preferably have a lifting handle attached thereto, and a rearward portion which will be located at the back of the cooker. The flue gas inlet and outlet openings are preferably located at opposite front and back sides of the inventive lid such that, for example, if the flue gas inlet opening is located in the rearward portion of the lid, the flue gas outlet opening will preferably be located in the forward portion of the lid such that the flue gas will flow through the flue gas flow channel from back to front. More preferably, the flue gas inlet opening will be located in the forward portion of the lid and the outlet opening will be located in the rearward portion of the lid such that the flue gas will flow through the flue gas flow channel from front to back.

As another alternative, the flue gas inlet and outlet openings can be located on opposite lateral right and left side areas of the inventive lid such that the flue gas will flow through the flue gas flow channel from left to right or from right to left.

In another aspect, the flue gas outlet opening will preferably be located and oriented in the rearward portion of the inventive lid in a manner effective such that a wind flow of at least 5 miles per hour toward the back side of the outdoor cooker will create a reduced pressure region outside of the flue gas outlet opening which will assist in pulling the flue gas through the flue gas flow channel. The outlet opening will preferably comprise either a single elongate opening or a plurality of openings which extend substantially horizontally across the rearward portion of the inventive lid.

Most preferably, the rearward portion of the lid is configured such that the lid comprises a substantially vertical back wall and a curved back portion which curves upwardly and forwardly from the top of the vertical back wall. The flue gas outlet opening(s) preferably extend(s) laterally across the rearward portion of the lid at a location above the top end of the vertical back wall (i.e., above the point where the vertical back wall ends and the upwardly and forwardly curved segment begins). Most preferably, the flue gas outlet opening(s) extend(s) horizontally across the back portion of the inventive lid at a location which is above and/or forward of an arc point of the curved segment which is 45° from the rearward beginning point of the curved segment (i.e., the point on the curved arc which is 45° from the top end of the vertical back wall).

In another aspect, the outwardly facing surface of the inner channel wall of the inventive lid (i.e., the surface of the inner channel wall which faces the outer channel wall) preferably has an emissivity of at least 0.7 and most preferably has an emissivity of at least 0.9. Alternatively, and/or in addition, the outwardly facing surface of the inner channel wall is preferably painted black.

In another aspect, the inwardly facing surface of the inner channel wall of the inventive lid (i.e., the surface of the inner channel wall which will face the food support grate) will preferably be a reflective, more preferably a highly reflective, surface having a shiny or aluminized finish and/or will preferably have an emissivity of less than or equal to 0.3.

In another aspect, the inventive lid and outdoor cooking apparatus are preferably constructed such that: the inventive lid has a downwardly extending back wall; the inventive outdoor cooking apparatus has an upwardly extending back wall; and when the inventive lid is in closed position on the cooking apparatus, the downwardly extending back wall of the inventive lid will be positioned adjacent to and will overlap with the upwardly extending back wall of the cooker housing. The downwardly extending back wall of the inventive lid will preferably be positioned outside of the back wall of the cooker housing and will preferably overlap with the back wall of the cooker housing by at least one-quarter inch. The back wall of the inventive lid will more preferably overlap with the back wall of the cooker housing by at least one-half inch and the vertical overlap will most preferably be in the range of from one-half inch to about one inch.

In one alternative, when the lid is closed, a lower portion of the back wall of the lid will preferably overlap and rest flush against an upper portion of the back wall of the cooker housing. Such arrangement assists in preventing a substantial amount of flue gas from escaping between the back wall of the cooker housing and the back wall of the inventive lid. Alternatively, a rearwardly projecting lip can be provided along the upper edge of the back wall of the cooker housing such that the back wall of the inventive lid will contact and rest against the lip when the lid is closed to assist in preventing flue gas from escaping through the back of the cooking apparatus between the cooker housing and the back wall of the lid.

In another aspect, the present invention provides an improvement for an outdoor cooking apparatus preferably of the type comprising an upwardly facing firebox and a lid for opening and closing the upper end of the firebox. The improvement preferably comprises: the lid having an inner wall; the lid also having a second wall outside of the inner wall; the lid having a flue gas flow channel which is formed between the inner wall and the second wall; the flue gas flow channel extending forwardly and rearwardly and from side-to-side above at least most of the upper opening of the firebox; one or more flue gas inlet openings through the inner wall for flow of a cooker flue gas from the firebox into the flue gas flow channel; and one or more flue gas discharge openings through the second wall for discharging the cooker flue gas from the flue gas flow channel.

Further aspects, features, and advantages of the present invention will be apparent to those of ordinary skill in the art upon examining the accompanying drawings and upon reading the following detailed description of the preferred embodiments.

DETAILED DESCRIPTION OF THE PREFERRED EMBODIMENTS

Figure 1:
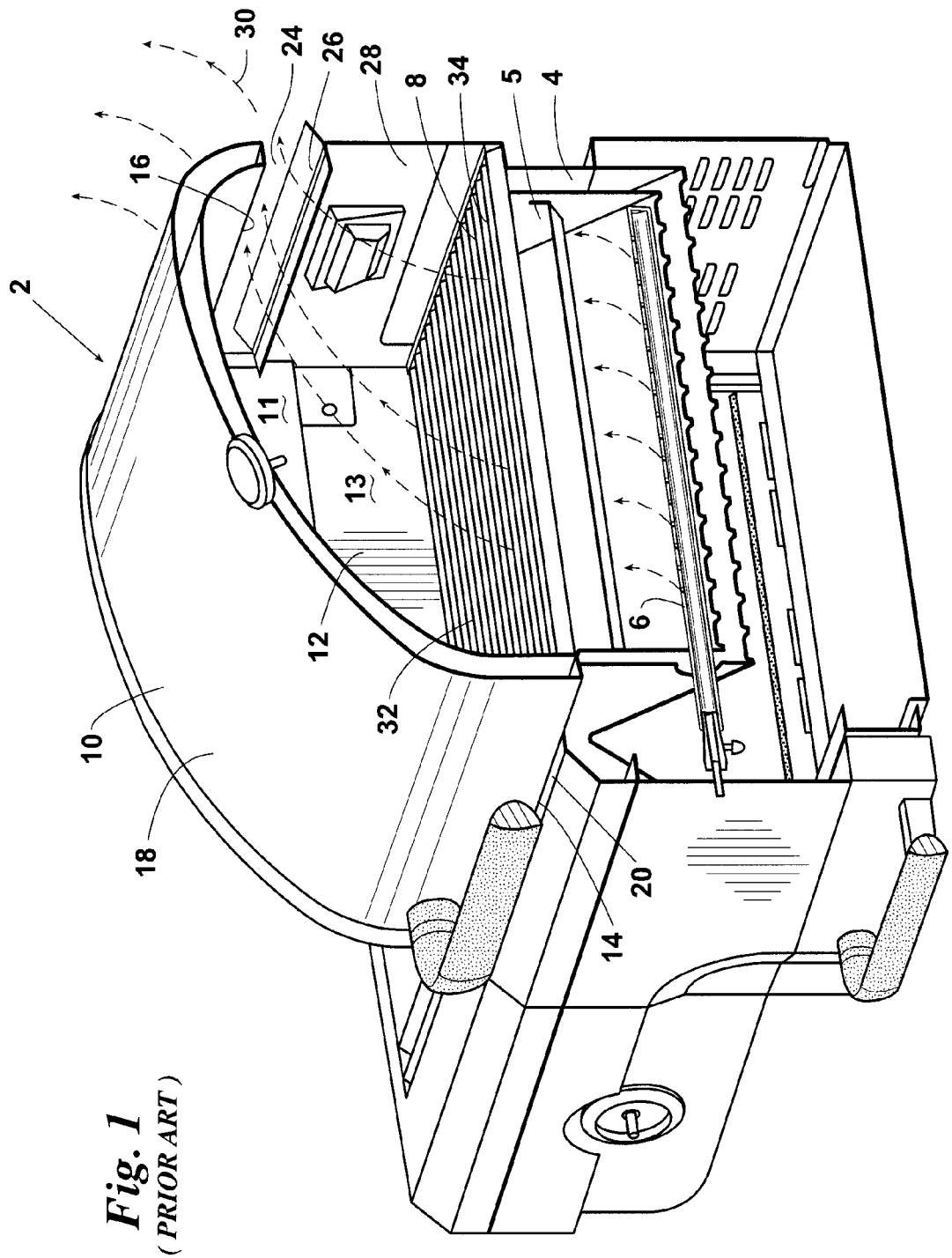
FIG. 1 is a cutaway perspective view of a prior art outdoor grill 2 having a prior art lid 10 pivotably provided thereon for opening and closing the prior art grill 2.
Figure 2:
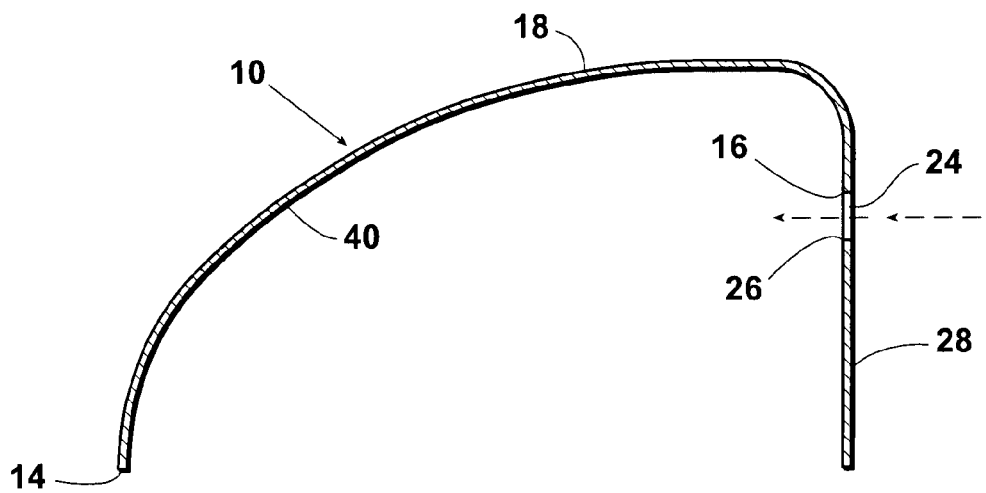
FIG. 2 schematically illustrates the effect of high wind conditions on the prior art lid 10.

An embodiment 100 of the outdoor cooking apparatus provided by the present invention is illustrated in FIGS. 3-9. In addition to utilizing an inventive lid structure 110, the inventive cooking apparatus 100 further comprises: a cooker housing 112 having an open-topped firebox 114; a heat source 116 or heat source location located within the firebox 114; a food support grate 118 preferably positioned in or near the upper portion of the firebox 114 above the heat source 116; and a support frame or other support structure 120 on which the cooker housing is supported and/or carried.

The heat source 116 used in the inventive cooking apparatus 100 can be any type of heat source used in outdoor grills and other outdoor cookers. Examples include, but are not limited to: one or more gas burners; one or more electric heating elements; a charcoal bed; a gas, electric, or other type of infrared burner; or a combination thereof The food support grate 118 used in the inventive cooker 100 can be any type of cooking grate used in grills or other types of outdoor cookers. Examples include, but are not limited to: open wire convection grates; other types of open convection grates; infrared cooking grates; combination infrared and convective cooking grates; etc.

The inventive lid 110 has a spacious upwardly extending interior which is preferably sized and shaped to allow the lid to be closed while cooking large products and to also provide room for one or more warming racks, a rotisserie rack or element, and/or other features used in outdoor cookers. Although the inventive lid can be formed in other shapes, the inventive lid 110 preferably comprises: an upwardly extending (preferably vertical) back wall 132 having a horizontal bottom edge 133; two opposing, upwardly extending (preferably vertical) side walls 134 and 136; a horizontally extending front bottom edge 138 which will rest on an upper horizontal surface or edge 140 of the fire box 114 when the lid 110 is closed; and an overarching top 142 which extends over and above the top of firebox 114, and over and above the cooking grate 118 from the top vertical end point 144 of the vertical back wall 132 of the lid 110 to the front bottom edge 138 of the lid 110.

In the embodiments shown in FIGS. 3-11, the overarching back-to-front top 142 of the lid 110 comprises (a) a rear curved segment 146 which curves upwardly and forwardly from the upper end point 144 of the vertical back wall 132 and (b) a covering portion 148 which extends forwardly and also curves and/or extends continuously, or at least eventually curves or extends, downwardly such that covering portion 148 reaches and culminates at the front bottom edge 138 of the lid 110.

The point 144 where the upwardly extending back wall 132 of the lid 110 ends and the upwardly and forwardly curving transition segment 146 begins is the point at which the tangent of the forwardly curving transition segment 146 is vertical. Similarly, if the curved segment is a 90° arch as illustrated in 2-8, the forward end 147 of the arch 146 is the point at which the tangent of the forwardly curving transition segment 146 is horizontal.

The inventive lid 110 preferably further comprises a lifting handle 145 attached to the front portion of the lid 110 and a pair of hinges, hinge assemblies, or other pivoting assemblies 150 and 152 connected between each of the left and right side walls 134 and 136 of the inventive lid 110 and the corresponding left and right side walls 154 and 156 which extend upwardly from the left and right sides of the firebox housing 114. The firebox side walls 154 and 156 preferably extend upwardly inside of and adjacent to the lid sidewalls 134 and 136. As one example, each side wall hinge assembly 150 and 152 can be a shoulder bolt and jam nut assembly which allows the inventive lid 110 to be rotated freely from its closed position shown in FIG. 8 to its open position shown in FIG. 7.

Figure 11:
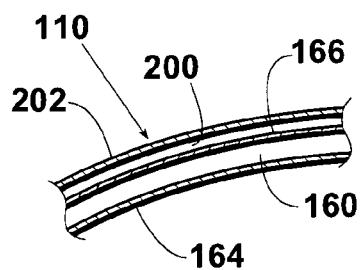
FIG. 11 schematically illustrates an alternative embodiment of the inventive lid.

In contrast to the grill lids heretofore used in the art, the overarching, back-to-front top 142 of the inventive grill lid 110 further comprises a flue gas flow channel 160 which preferably extends over at least most of the firebox 114 and/or at least most of the cooking grate 118. The flue gas flow channel 160 is formed by a gap between an inner channel wall 164 and an outer channel wall 166. The inner channel wall 164 preferably also constitutes all or at least most of (a) the interior wall for the overarching top 142 and (b) the interior wall for the curved rear segment 146 of the lid 110. The inner channel wall 164 can also, if desired, constitute at least an upper portion of the interior wall for the vertical back wall 132 of the lid 110. The outer channel wall 166 can be the exterior wall of the lid 110 as shown in FIGS. 3-10 or can be a third, intermediate lid wall as illustrated in FIG. 11.

The inner channel wall 164, and the flow channel 160 which it forms, preferably begin along a horizontal line in the rearward portion of the lid 110 which extends from the left side to the right side of the grill lid 110 either at, below, or above the point 144 which defines the beginning of the forwardly curved transition segment 146 of the lid 110. The flue gas flow channel 160 preferably extends to the forward portion of the lid, and more preferably extends either to, or to a point just above, the horizontal front bottom edge 138 of the lid 110.

The inner channel wall 164 of the flue gas flow channel 160 has a flue gas inlet opening 170 which preferably comprises either a single elongate slot or a plurality of slot segments or other apertures, holes, or openings of any kind, which preferably extend horizontally across the inner channel wall 164 in the forward portion 174 of the lid 110. A similar flue gas outlet opening 172 preferably comprising an elongate horizontal slot or a horizontal series of slots or other apertures, holes, or openings of any kind is preferably formed through and extends across a rearward portion 176 of the outer channel wall 166 such that the flue gas received in the inlet opening(s) 170 will flow through the flue gas flow channel 160 from front to back and will then be discharged from the outlet opening(s) 172.

The inner channel wall 164 will preferably be shaped, and the flue gas inlet opening(s) 170 will preferably be positioned so that, when the lid 110 is closed, the inlet openings (a) will be at an elevation which is at least 1.8 inches (more preferably from about 2 to about 4 inches) above the elevation of the cooking grate 118 and/or the front sealing edge or surface 140 of the firebox 114 and (b) will not be at a longitudinal position which is more than 2 inches (more preferably not more than 1 inch) rearward of the forward edge 119 of the cooking grate 118 and/or the interior front wall 115 of the firebox 114.

The outlet opening(s) 172 through the outer channel wall 166 will preferably not be located at a longitudinal position which is more than 2 inches (more preferably not more than 1 inch) forward of the rearward edge 121 of the cooking grate 118 and/or the interior back wall 117 of the firebox 114.

Alternatively, the positions of the inlet and outlet openings 170 and 172 in the front and back portions 174 and 176 of the lid 110 can be reversed such that the flue gas will flow through the flue gas flow channel 160 from back to front. As another alternative, the flue gas inlet and outlet openings can be positioned on opposite lateral sides of the inventive lid 110 such that the flue gas will flow through the flue gas flow channel laterally from right to left or laterally from left to right.

Figure 9:
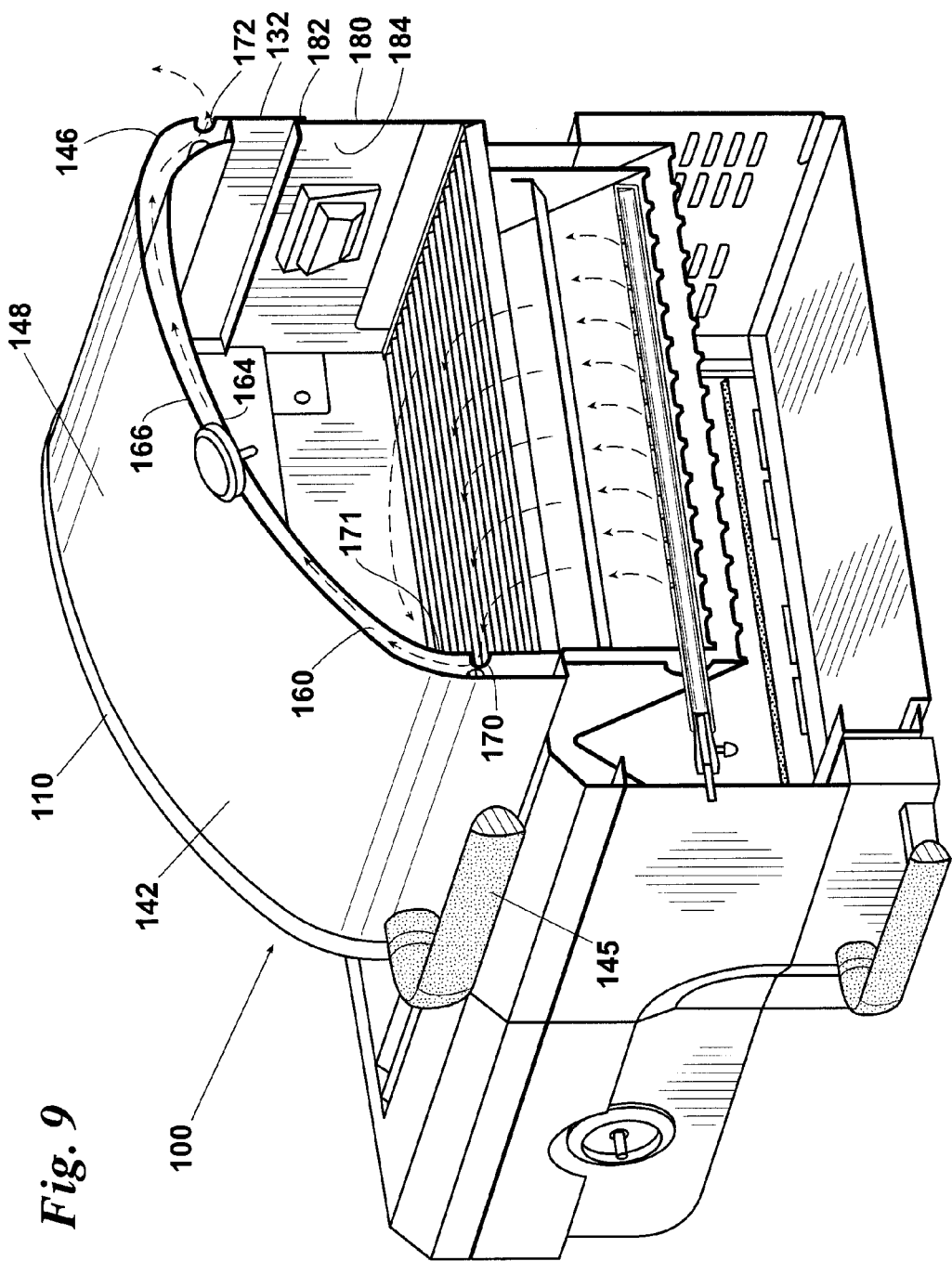
FIG. 9 is a front perspective view of a slightly different embodiment of the inventive grill 100 with the inventive lid 110 in closed position.

In the slightly different embodiment of the inventive lid 110 shown in FIG. 9, the forward-most portion of the overarching top 142 becomes vertical or substantially vertical at the front of the lid 110 and the interior flue gas inlet opening(s) 170 of the flue gas flow channel 160 are located in this forward vertical portion 171 of the inner channel wall 164. In the embodiment of the inventive lid 110 depicted in FIGS. 3-8, the overarching top 142 of the lid 110 has more of a continuous curvature from back to front such that the forward portion 174 of the lid 110 where the flue gas inlet opening(s) 170 is/are located is mostly, but not entirely, vertical.

The firebox 114 of the cooker housing 112 preferably includes an upwardly extending, preferably vertical, back wall 180 which extends upwardly inside the back wall 132 of the lid 110 such that, when the lid 110 is closed, a lower portion 182 of the lid back wall 132 will overlap with an upper portion 184 of the firebox back wall 180. The amount of overlap (i.e., the vertical height of the corresponding overlapping portions 182 and 184) will preferably be at least one-quarter inch. The overlap of the lower portion 182 of the lid back wall 132 and the upper portion 184 of the firebox back wall 180 will more preferably be at least one-half inch and will most preferably be in the range of from one-half inch to about one inch.

In the embodiment of the inventive lid 110 and cooking apparatus 100 depicted in FIG. 9, the vertical lower portion 182 of the lid back wall 132 contacts and rests against the vertical upper portion 184 of the firebox back wall 180 when the lid 110 is closed. However, in the embodiment of the inventive lid 110 depicted in FIGS. 3-8, a horizontal rearwardly-projecting lip 186 is provided along the upper edge of the firebox back wall 180 such that the lower portion 182 of the lid back wall 132 will contact and rest against the upper lip 186 of the firebox back wall 180 when the lid 110 is closed. In either case, the contact between (a) the lid back wall 132 and (b) the firebox back wall 180 or lip 186 when the lid is closed prevents any significant amount of flue gas from escaping from the back of the grill 110 between the firebox back wall 180 and the lid back wall 132. This helps to ensure that most, almost all, or all of the flue gas will be forced to exit the cooker 100 by flowing into the interior flue gas inlet opening(s) 170 in the forward portion of the lid 110. (It will also be understood concerning the embodiment of FIGS. 3-8 that a rearwardly projecting sealing lip 186 can be located at any other desired elevation on the firebox back wall 180.)

As the flue gas produced by the heat source 116 of the inventive grill 100 flows through the flue gas flow channel 160 of the inventive lid 110, the hot flue gas heats the inner channel wall 164 of the lid 110. The heat energy transferred to the inner channel wall 164 by the flue gas is emitted primarily as infrared radiant energy from the inwardly facing surface 188 of the inner channel wall 164 (i.e., the surface 188 of the inner channel wall 164 facing the food support grate 118) toward the food product placed on the food support grate 118.

In order to more effectively absorb heat energy from the flue gas flowing through the channel 160, the outwardly facing surface 190 of the inner channel wall 164 will preferably have an emissivity of at least 0.7 and will more preferably have an emissivity of at least 0.9. The inwardly facing surface 188, on the other hand, will preferably have a reflective, more preferably a highly reflective, shiny, or aluminized finish with an emissivity of less than or equal to 0.3 so that, in addition to emitting heat energy absorbed from the flue gas, the inwardly facing surface 188 of the inventive lid 110 will also be effective for reflecting radiant energy from the heat source 116 and/or cooking grate 118 back toward the food product. The inner channel wall 164 of the inventive lid 110 will preferably be formed of inexpensive aluminized steel and will preferably have a highly emissive black paint applied to the outwardly facing surface 190 thereof As mentioned above, the inventive cooking apparatus 100 with the lid 110 provides a much more even heat distribution over the food support grate 118 from front to back than is provided by the prior art grill 2. In the inventive cooker and lid assembly 100 wherein the flue gas must leave the firebox 114 via an interior opening 170 in the front of the lid 110, there is no opening or gap in the back of the apparatus at or near the elevation of the cooking grate which will allow infiltrating air to be pulled into the firebox 114. Moreover, the overlapping back wall arrangement substantially closes the back of the inventive grill 110 to prevent any significant air infiltration even at a higher location.

Using the inventive lid 110, the creation of low pressure regions and the occurrence of excessive air infiltration are also prevented or greatly reduced by selectively sizing the width of the flue gas flow channel and the inlet and outlet openings 170 and 172 so as to maintain a low, yet adequate, back pressure at the heat source 116 to prevent excess secondary air inflow into the firebox 114 and to improve the uniformity of the flow of flue gas toward and through the cooking grate 118. These characteristics and features not only operate to provide a much more even flow and distribution of flue gas and heat flux toward and through the cooking grate 118, but, along with the heat recovery from the flue gas provided by the inventive lid 110, also operate to greatly increase the thermal efficiency of the inventive cooking apparatus. Typically, the vertical width of the flue gas inlet and outlet openings 170 and 172 and the width of the flue gas flow channel gap 160 between the inner and outer channel walls 164 and 166 will preferably be in the range of from about 10 to about 15 mm.

Another advantage resulting from this improved efficiency and operation of the inventive cooking apparatus 100 is that, because significantly less fuel is used to operate the inventive grill and achieve the desired temperature of the cooking grate 118, the temperature of the surfaces of or adjacent to the gas burner or other heat source 116 can be significantly reduced, thus reducing the occurrence of flare-ups resulting from the dripping of fat and grease materials from the food products onto these surfaces.

Further improvements in the efficiency of the inventive cooking apparatus 100 can also be obtained by eliminating or optimizing (i.e., reducing the size of) the rotisserie holes 194, 196 provided through the side walls of the inventive lid 110.

Figure 10:
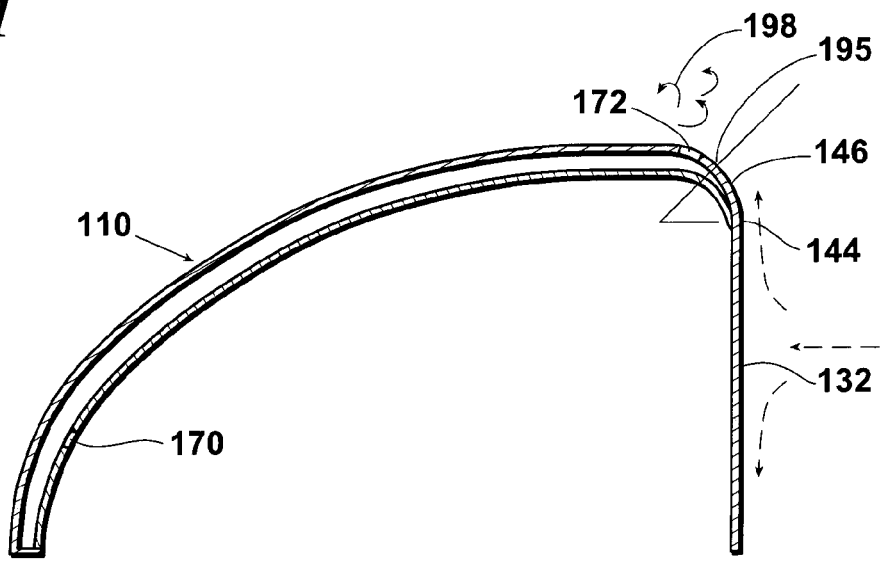
FIG. 10 schematically illustrates the effect of high wind conditions on the inventive lid 110.
Figure 3:
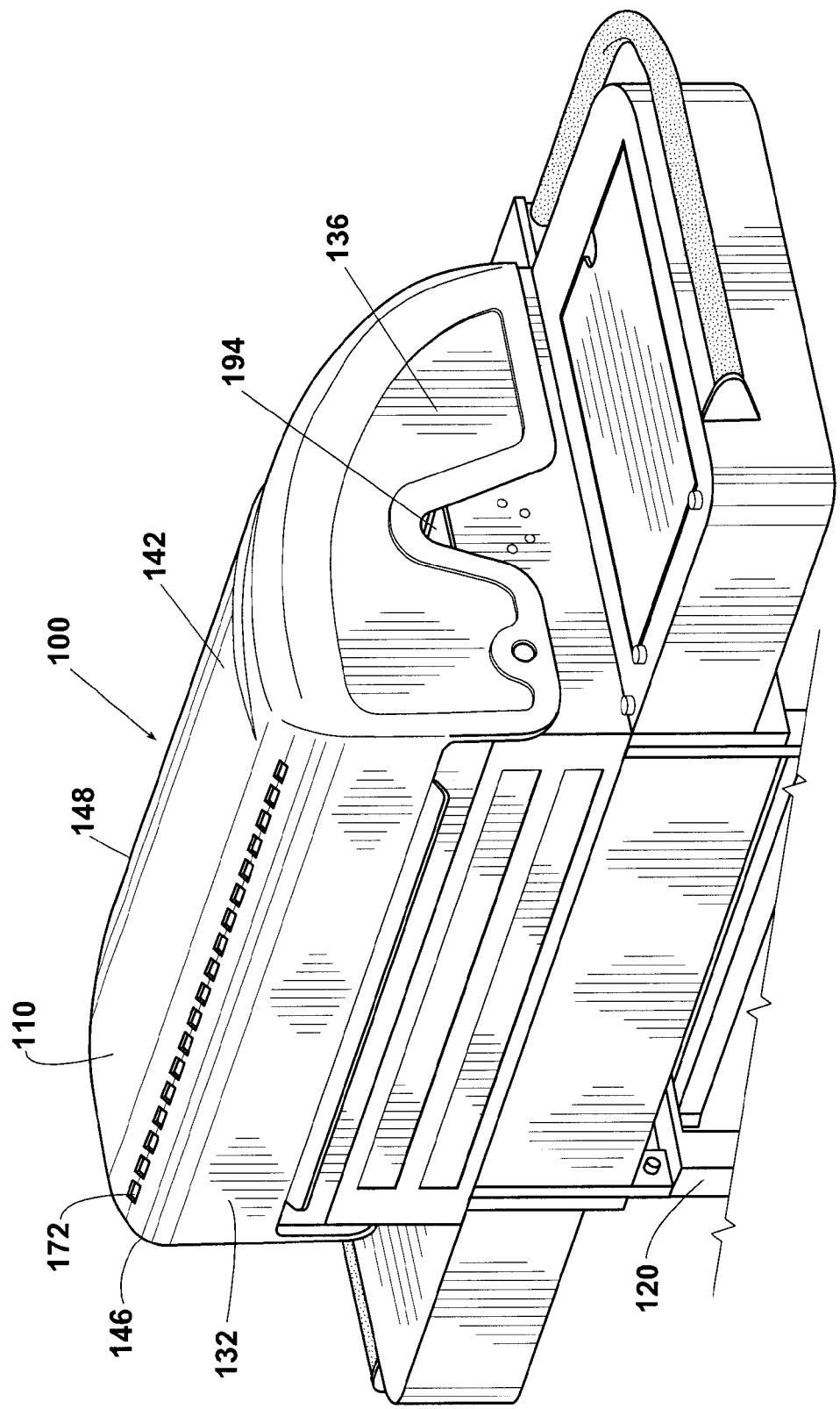
FIG. 3 is a rear perspective view of an embodiment 100 of the outdoor cooking apparatus and an embodiment 110 of the lid therefor provided by the present invention.
Figure 4:
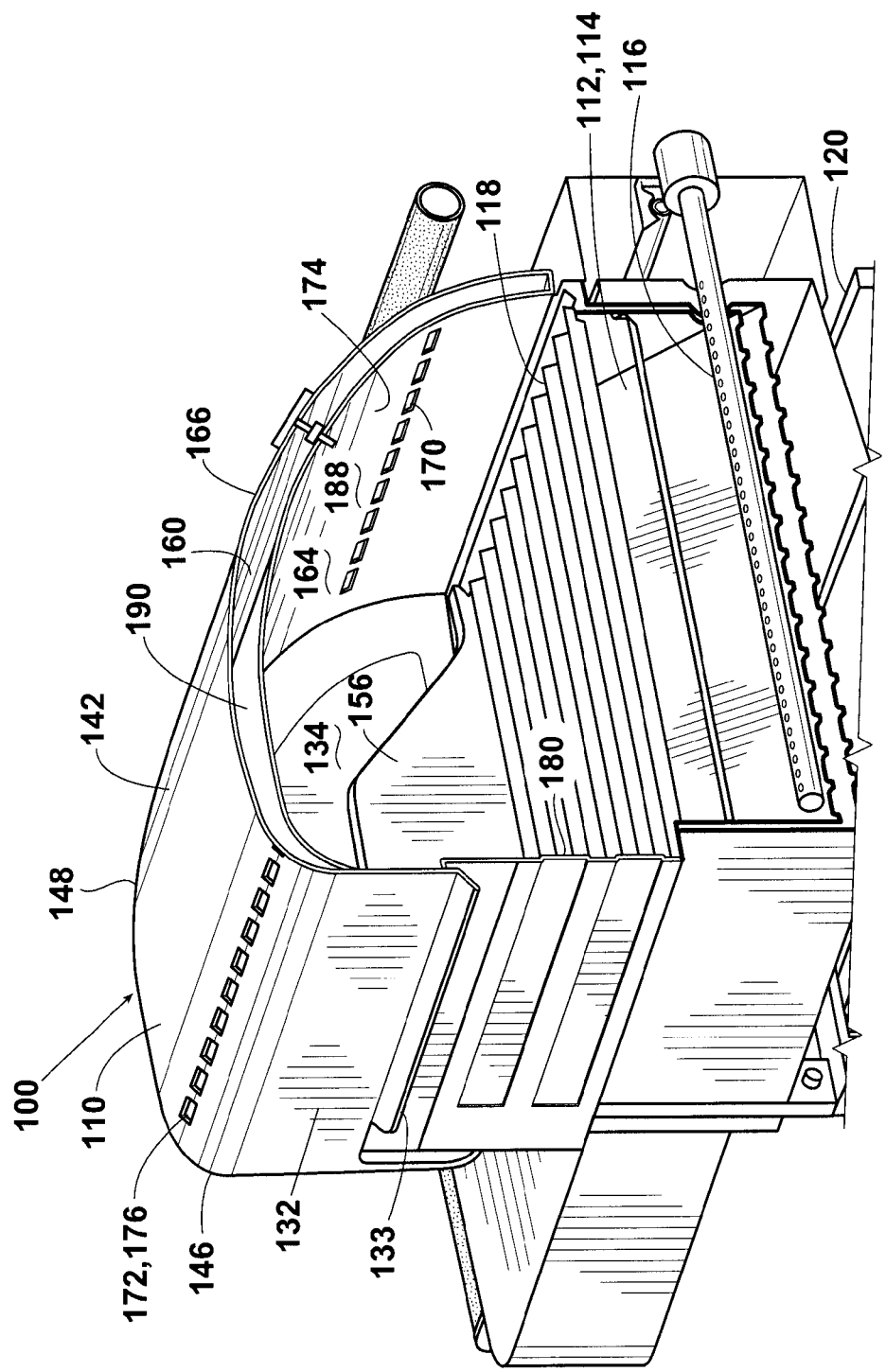
FIG. 4 is a cutaway rear perspective view of the inventive cooking apparatus 100 with the inventive lid 110 in closed position.
Figure 5:
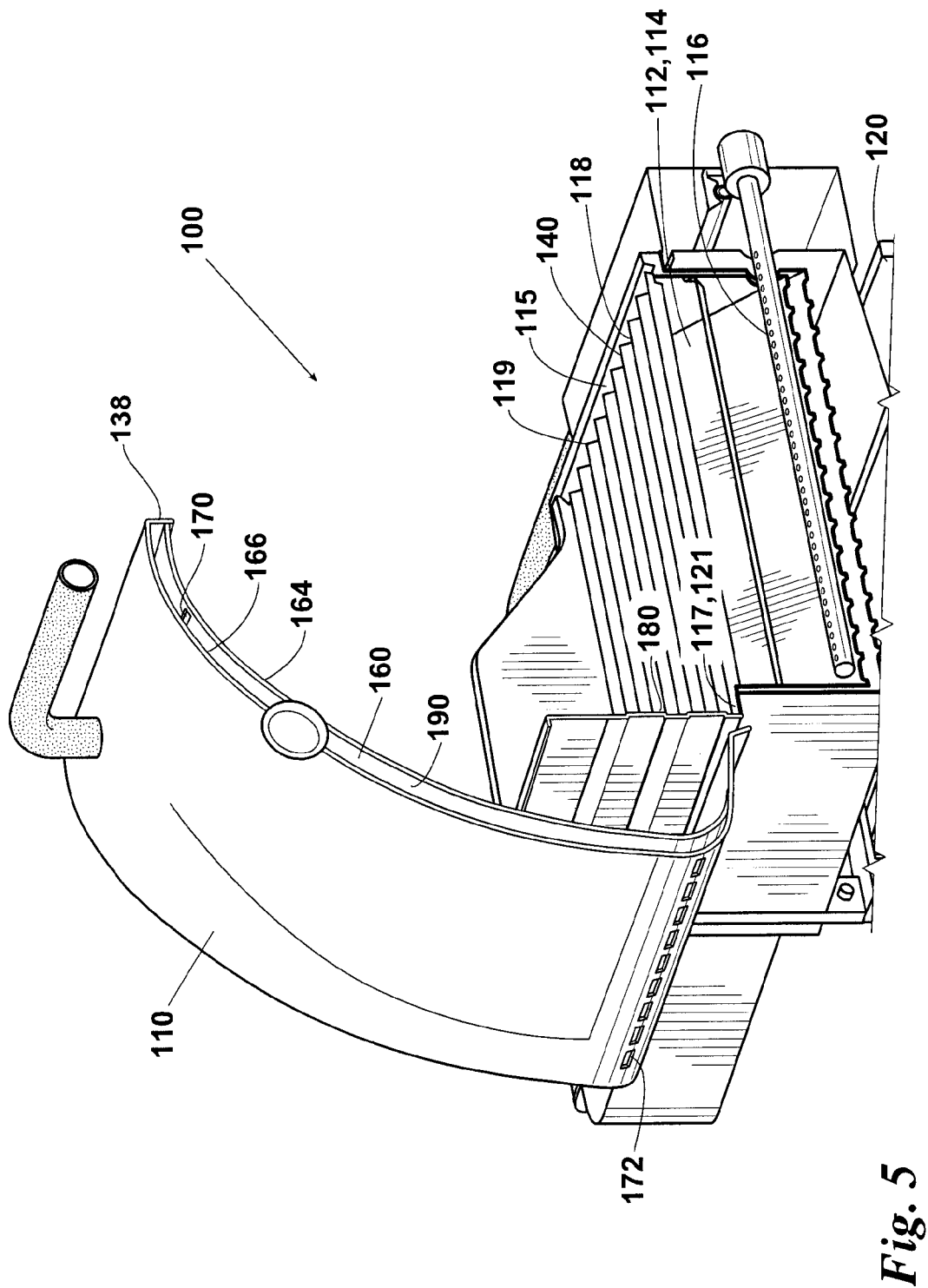
FIG. 5 is a cutaway rear perspective view of the inventive outdoor cooking apparatus 100 with the inventive lid 110 in open position.
Figure 6:
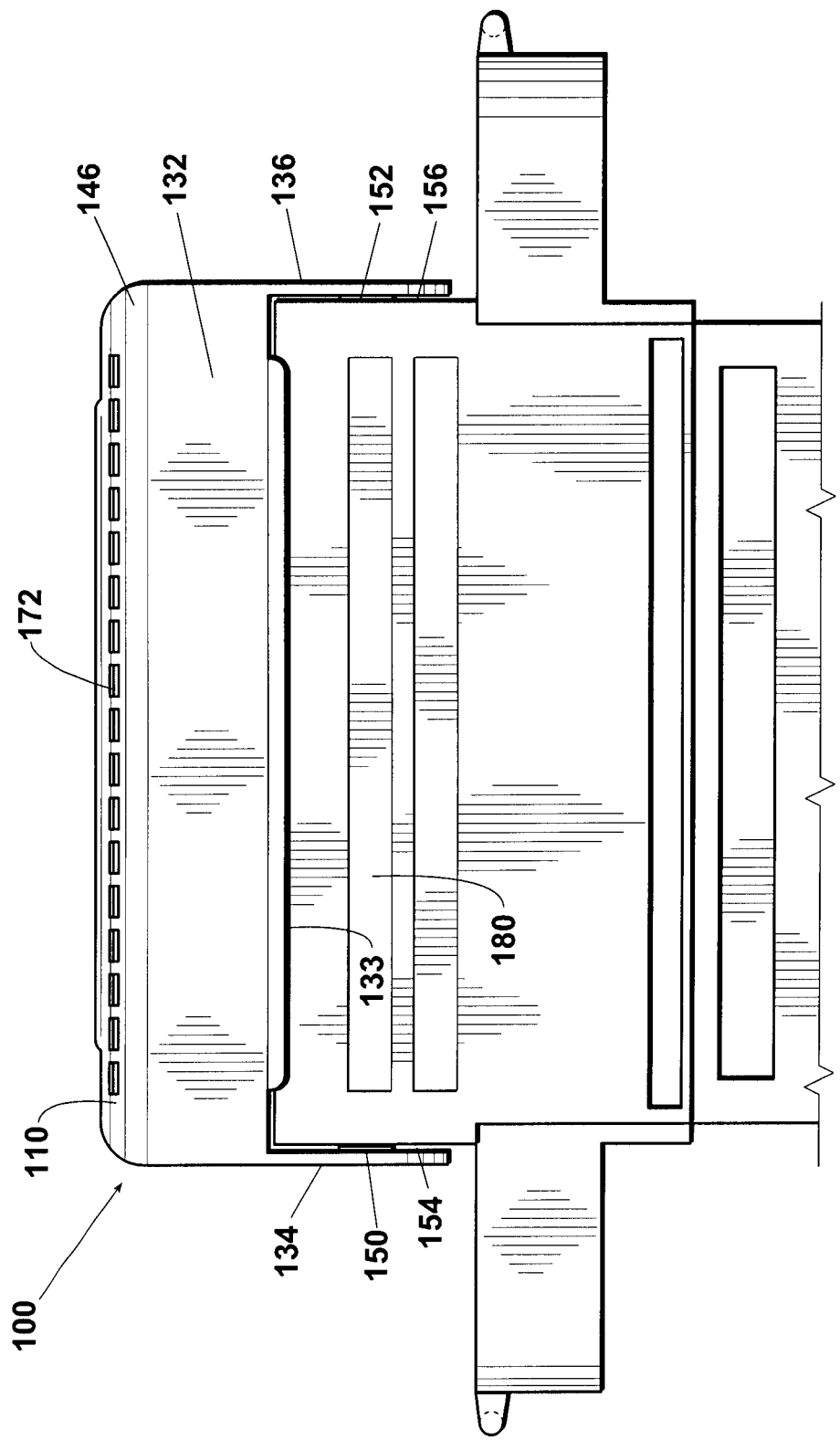
FIG. 6 is an elevational rear view of the inventive outdoor cooking apparatus 100 with the inventive lid 110 in closed position.
Figure 7:
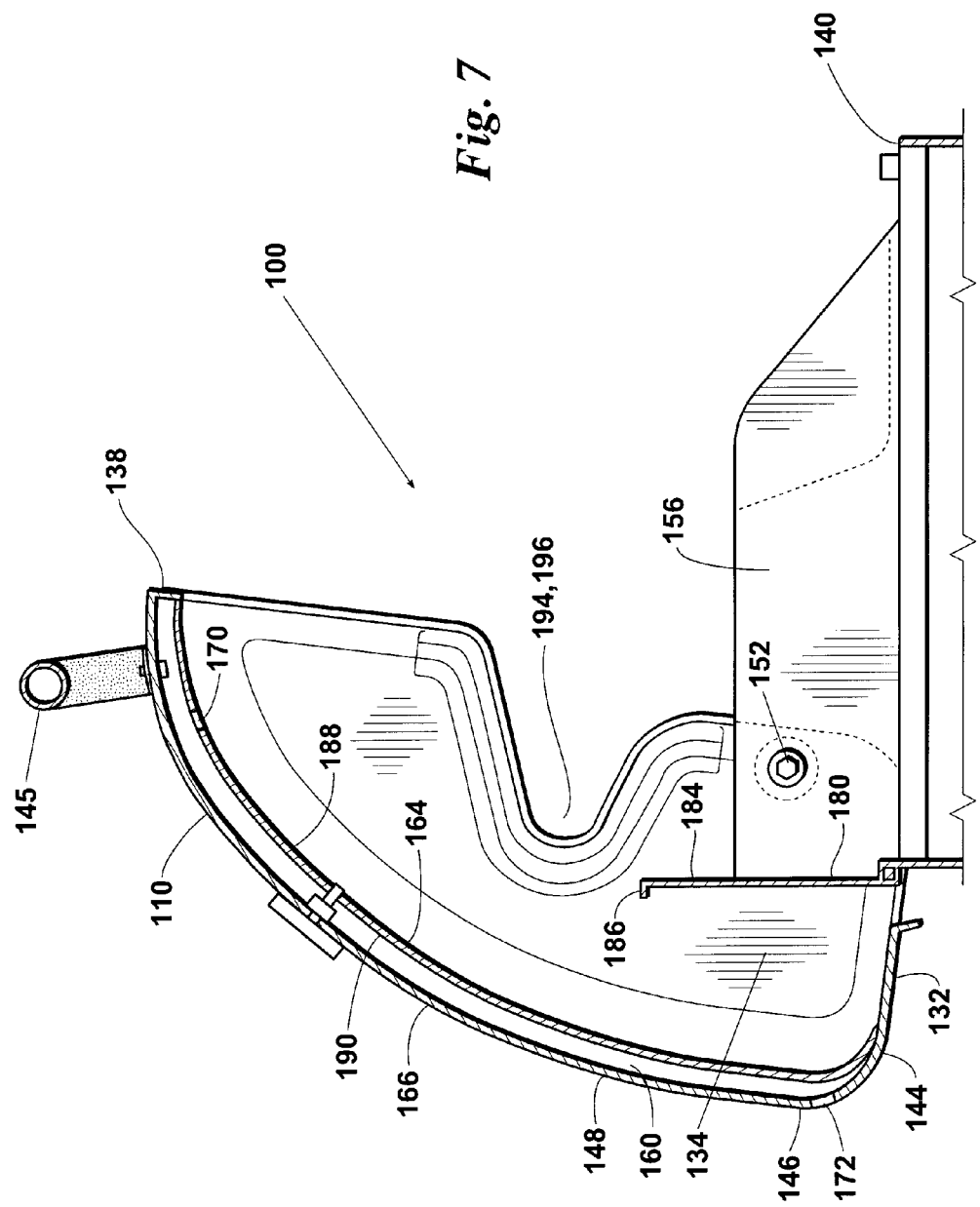
FIG. 7 is a cutaway elevational side view of the inventive outdoor cooking apparatus 100 with the inventive lid 110 in open position.
Figure 8:
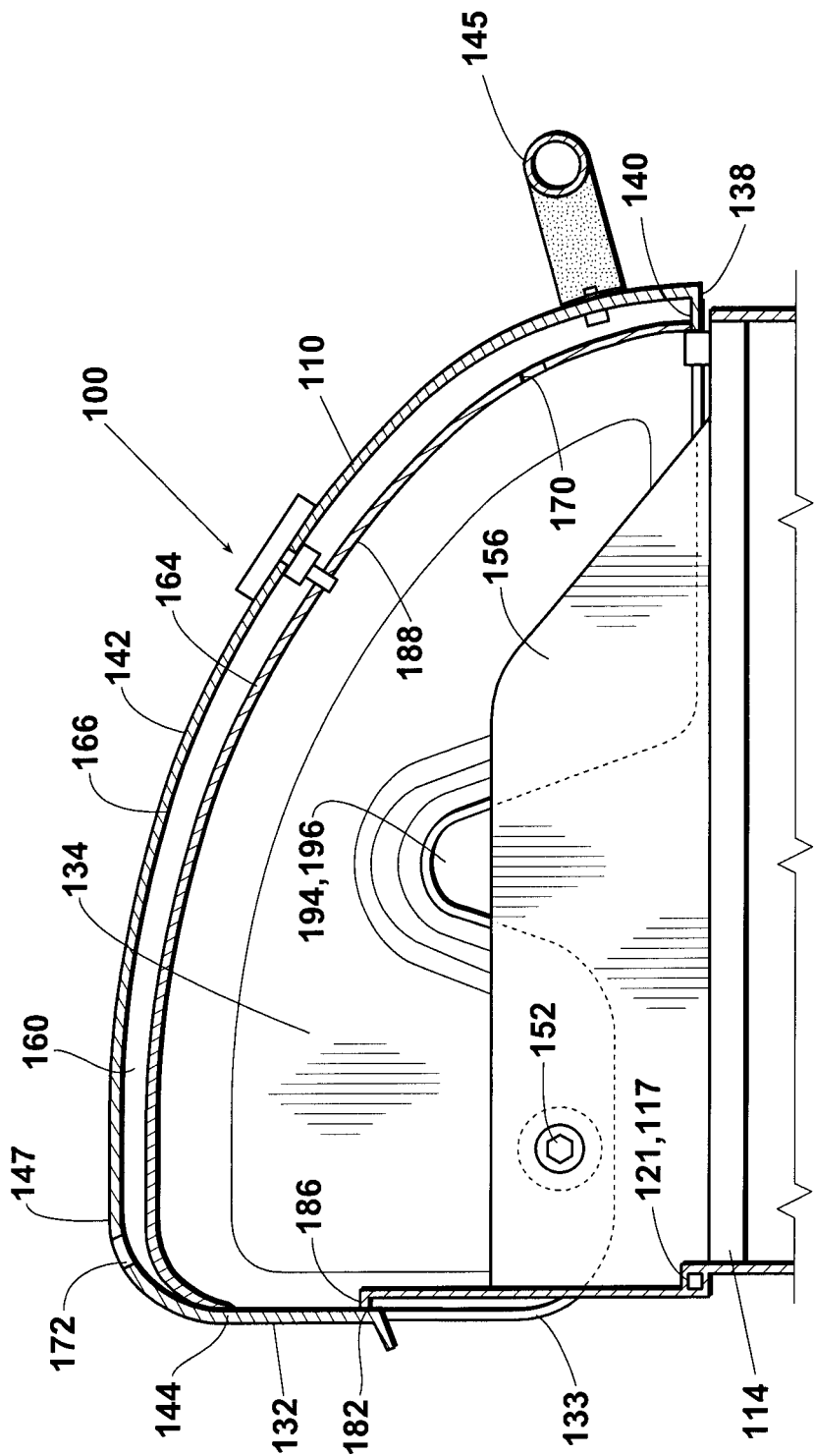
FIG. 8 is a cutaway elevational side view of the inventive outdoor cooking apparatus 100 with the inventive lid 110 in closed position.

By eliminating the flue gas exhaust opening 24 which must be present across the back of the prior art grill 2, the inventive cooking apparatus and lid assembly 100 is also highly resistant to disruption or choking as a result of high wind conditions. Moreover, by properly positioning the flue gas outlet opening(s) 172 across the back portion of the inventive lid 110, wind velocities of 5 miles per hour or more can actually improve the operation of the inventive system as depicted in FIG. 10 by causing the creation of flow eddies 198 which produce a low pressure region immediately outside of the outlet opening(s) 172. Further, the inventive grill 100 will continue to operate at high wind velocities of even greater than 25 mph which would shut down the prior art grill 2 or prevent the grill 2 from operating in an acceptable manner.

In order to produce these results, the horizontally-extending flue gas outlet opening(s) 172 will preferably be located above the point 144 where the upwardly extending back wall 132 of the lid 110 ends and the forwardly curving transition segment 146 begins. Most preferably, as illustrated in FIG. 10, the horizontally-extending flue gas outlet opening(s) 172 will be located above the point 195 of the curved arc 146 which is 45° from the back beginning point 144 of the arc 146.

Also in accordance with the present invention, it will be understood that the wind resistance of other grill and lid assemblies can be improved by positioning the flue gas exhaust opening in the manner described above. However, care should be taken in the case of other types of grill lids to also position the exhaust opening, and/or to incorporate further structures, in order to, e.g., prevent rain infiltration into the grill.

In the alternative embodiment depicted in FIG. 11, the outer channel wall 166 of the flue gas flow channel 160 is an intermediate wall located within the top of the inventive lid. Consequently, an insulating gap 200 is formed between the outer channel wall 166 and the exterior covering wall 202 of the lid. The creation of an insulating gap 200 in this embodiment further increases the thermal efficiency of the inventive cooking apparatus by reducing heat losses through the exterior covering wall 202 and also protects the outer exterior surface from discoloration and other damage due to excessive heating.

EXAMPLE

Comparative tests were conducted using the prior art grill 2 depicted in FIG. 1 versus the inventive grill 100 depicted in FIG. 9. Each grill utilized a one inch tube burner with a porcelain-coated cast iron convective cooking grate. In each case, the heat input to the grill was 46.77 kw/in². The results obtained for the prior art grill 2 were as follows:

Total heat flux at the center of the cooking area: 22.7 kw/in².
Flue gas exit temperature: 449° F.
Thermal efficiency: 48.5%.
Inside lid surface temperature: 400° F.

In contrast, the inventive grill 100 provided a surprising degree of improvement over the prior art grill 2. The results obtained for the inventive grill 100 were as follows:

Total heat flux at the center of the cooking area: 41.7 kw/in².
Flue gas exit temperature: 351° F.
Thermal efficiency: 89.2%.
Inside lid surface temperature (near the inlet holes 170): 650° F.

In addition, the infrared percentage of the total heat flux at the cooking area was greatly improved using the inventive grill 100. The sensor used in the test faced downward and was therefore only able to distinguish the infrared flux coming from the firebox. However, considering only this upward flux alone, the infrared flux from the firebox of the inventive grill 100 was 39.5% infrared energy whereas the upward flux from the firebox of the prior art grill 2 was only 31.3% infrared energy. Moreover, a further significant improvement in infrared flux, which the downwardly facing sensor could not see, results from the 250° F. increase in the inside lid surface temperature achieved in the inventive lid 110 versus the prior art apparatus 2. As is known in the art, infrared radiant emission increase exponentially (i.e., to the fourth power) as the absolute temperature of a surface increases.

\*\*\*

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention as defined by the claims.

What is claimed is:

1. In an outdoor cooking apparatus comprising:
    an upwardly facing firebox and
    a lid for opening and closing an upper opening of said firebox,
    the improvement comprising:
    said lid having an inner wall;
    said lid having a second wall outside of said inner wall;
    said lid having a flue gas flow channel which is formed between said inner wall and said second wall, said flue gas flow channel extending forwardly and rearwardly and from side-to-side above at least most of said upper opening of said firebox;
    one or more flue gas inlet openings through said inner wall for flow of a cooker flue gas from said firebox into said flue gas flow channel; and
    one or more flue gas discharge openings through said second wall for discharging said cooker flue gas from said flue gas flow channel.

2. The outdoor cooking apparatus of claim 1 wherein the improvement further comprises said one or more flue gas inlet openings through said inner wall and said one or more flue gas discharge openings through said second wall being located in opposite forward and rearward portions of said lid such that said cooker flue gas will flow through said flue gas flow channel in a front to back direction or in a back to front direction.

3. The outdoor cooking apparatus of claim 1 wherein the improvement further comprises said one or more flue gas inlet openings through said inner wall being located in a forward portion of said lid and said one or more flue gas discharge openings through said second wall being located in a rearward portion of said lid such that said cooker flue gas will flow through said flue gas flow channel in a front to back direction.

4. The outdoor cooking apparatus of claim 3 wherein the improvement further comprises said one or more flue gas discharge openings being configured and positioned such that a wind of 5 miles per hour against a back side of said outdoor cooking apparatus will create a reduced pressure region outside of said one or more flue gas discharge openings which will assist in drawing said cooker flue gas through said flue gas flow channel.

5. The outdoor cooking apparatus of claim 3 wherein the improvement further comprises:
   said lid having an upwardly extending back side, a forwardly extending top portion, and a curved upper back portion where said lid transitions from an upper end of said upwardly extending back side to said forwardly extending top portion and
   said one or more discharge openings through said second wall being located elevationally above said upper end of said upwardly extending back side of said lid.

6. The outdoor cooking apparatus of claim 5 wherein the improvement further comprises said one or more discharge openings being formed through said second wall at a location which is above and forward of an arc point of said curved upper back portion of said lid which is 45° from said upper end of said upwardly extending back side of said lid.

7. The outdoor cooking apparatus of claim 6 wherein the improvement further comprises said one or more flue gas discharge openings through said second wall being at a location which is not more than 2 inches forward of a back wall of said firebox.

8. The outdoor cooking apparatus of claim 3 wherein the improvement further comprises said one or more flue gas inlet openings through said inner wall being at a location which is at least 1.8 inches above and not more than 2 inches rearward of a front upper edge or a front upper sealing surface of said firebox.

9. The outdoor cooking apparatus of claim 8 wherein the improvement further comprises said one or more flue gas discharge openings through said second wall being at a location which is not more than 2 inches forward of a back wall of said firebox.

10. The outdoor cooking apparatus of claim 1 wherein the improvement further comprises said inner wall of said lid having an outer surface which faces said flue gas flow channel and said outer surface of said inner wall having an emissivity of at least 0.7.

11. The outdoor cooking apparatus of claim 10 wherein the improvement further comprises said outer surface of said inner wall being painted black.

12. The outdoor cooking apparatus of claim 10 wherein the improvement further comprises said inner wall of said lid having an inner surface which faces said firebox and said inner surface has an emissivity of less than or equal to 0.3.

* * * * *